March 11, 1924.

E. E. TOWNSEND 1,486,814

MECHANICALLY REPRODUCING PORTRAITS IN RELIEF FROM STEREOSCOPIC PHOTOGRAPHS

Filed Nov. 25, 1922  2 Sheets-Sheet 1

INVENTOR.
E. E. Townsend.
By A. Millard Hack.
her Attorney.

March 11, 1924.

E. E. TOWNSEND 1,486,814

MECHANICALLY REPRODUCING PORTRAITS IN RELIEF FROM STEREOSCOPIC PHOTOGRAPHS

Filed Nov. 25, 1922    2 Sheets-Sheet 2

INVENTOR.
E. E. Townsend.
By A. Millward Flack,
her Attorney.

Patented Mar. 11, 1924.

1,486,814

UNITED STATES PATENT OFFICE.

ELIZABETH EDITH TOWNSEND, OF NORTHDOWN, NEAR MARGATE, ENGLAND.

MECHANICALLY REPRODUCING PORTRAITS IN RELIEF FROM STEREOSCOPIC PHOTOGRAPHS.

Application filed November 25, 1922. Serial No. 603,380.

*To all whom it may concern:*

Be it known that I, ELIZABETH EDITH TOWNSEND, a subject of the King of Great Britain, residing at Bute Cottage, Northdown, near Margate, in the county of Kent, England, have invented a new or Improved method of and means for mechanically reproducing portraits in relief from stereoscopic photographs, of which the following is a specification.

This invention relates to a new or improved method of and means for mechanically reproducing portraits, figures, models or the like in the round, in relief, or in intaglio from stereoscopic photographs.

The present invention is based on the known principle that two separate photographs of the same object taken under certain conditions yield all the information necessary in order to produce an accurate geometrical description of such object represented in both photographs and the object of the present invention is the production of a machine embodying this principle so that any object that is capable of being photographed will be capable of being reproduced in a mechanical way either in the round, in relief or in intaglio and that in any desired scale in relation to the original object.

The present invention comprises essentially a method of reproducing a copy of the surface of a three-dimensioned figure, in the round, in relief or in intaglio, from a pair of stereoscopic photographs of said figure, the characteristic feature of the method being that the detail in one photograph is utilized to control the movements of the cutting tool of a carving machine in two dimensions (e. g., height and breadth) while variations between the two photographs are utilized to control the movements of the tool in the third dimension (e. g., the depth).

This invention will be now more particularly described making reference to the accompanying drawings, in which:—

Throughout the views similar parts are marked with like letters of reference.

Figure 1:
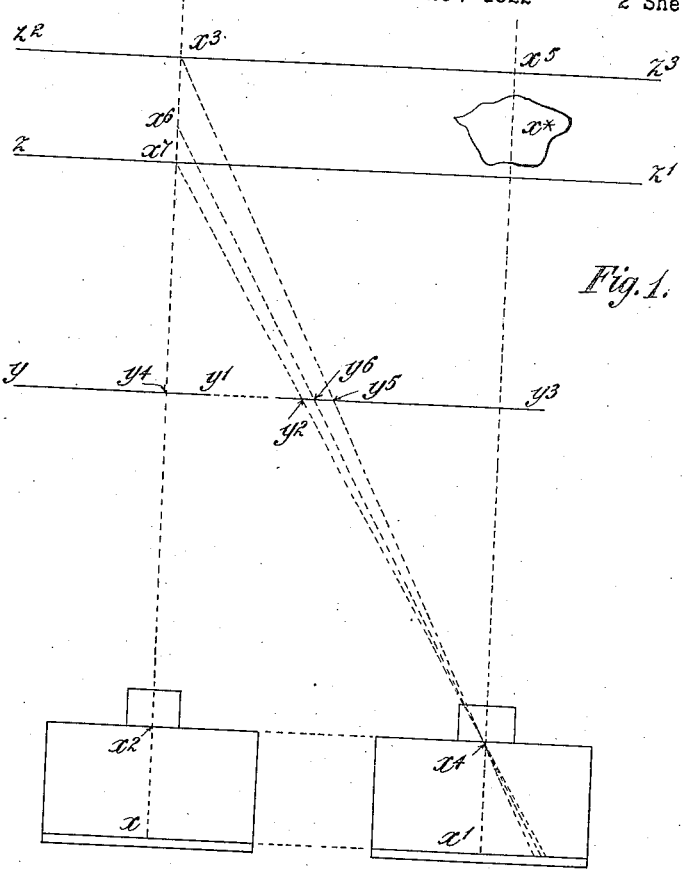
Fig. 1 is a diagram showing the principle on which this invention is based.

Referring to Fig. 1, two photographic plates or films $x$ and $x^1$ are exposed in a camera situated at the two successive positions shown or alternatively in two cameras with identical objectives situated at these positions. The principal optical axes $x^2$, $x^3$ and $x^4$ $x^5$ of the objectives are preferably parallel to one another, in the same plane and perpendicular to the common plane of the plates $x$, $x^1$ and to the base-line $x^2$, $x^4$ connecting the objectives. These are the conditions under which stereoscopic photographs are usually obtained.

The three-dimensional object $x^*$ to be photographed is preferably arranged centrally with the principal optical axis of one of the objectives. The cameras should be sufficiently far from the object as to prevent any appreciable error of distortion. From the exposed plates photographs $y$, $y^1$ and $y^2$ $y^3$ on any desired scale are produced and can be considered as forming an appropriate picture-plane $y$, $y^3$ parallel to the plane of the plates $x$, $x^1$.

All object-points (e. g., $x^3$, $x^6$, $x^7$) along one principal optical axis $x^2$ $x^3$ will have their images coincident at the principal point $y^4$ of the resulting photograph $y$, $y^1$ but on the second photograph $y^2$, $y^3$ the images of these object-points will be separated as shown at $y^5$, $y^6$ and $y^2$ respectively.

Now the separation-distance $y^4$, $y^2$ between homologous image-points in the picture-plane $y$, $y^3$ is constant for all object-points in the plane $z$, $z^1$ through $x^7$ parallel to the picture-plane $y$, $y^3$, and the separation-distance $y^4$, $y^5$ between homologous image-points in the picture-plane $y$, $y^3$ is constant for all object-points in the plane $z^2$, $z^3$ through $x^3$ parallel to the picture-plane $y$, $y^3$ and so on.

Further, so long as the perpendicular depth $x^7$, $x^8$ between the planes $z$ $z^1$ and $z^2$, $z^3$ is small compared with the perpendicular distance $x^2$, $x^7$ between the base-line $x^2$, $x^4$ and the object-plane $z$, $z^1$ nearest to it, the ratio that the variation-distance $y^3$, $y^6$ will bear to the depth $x^7$, $x^9$ will be substantially equal to the ratio that the variation-distance $y^3$, $y^5$ will bear to the depth $x^7$, $x^8$. The cameras are so disposed as to satisfy this condition.

Then in the conditions described, increases in the separation of homologous image-points in a properly mounted pair of stereoscopic photographs of a three-dimensional object will be substantially proportional to increases in the distance of the originating object-points from the base-line.

If the two photographs are taken with one (or both) of the principal optical axes not perpendicular to the base-line one (or both) of the photographs must be redressed in manner well understood by tilting the negative and screen when printing in an enlarging lantern, so that the resulting photographs may be identical with the photographs that would have been obtained if the optical axes had been perpendicular to the base-line.

The two photographs produced as described are mounted side by side in proper relation upon a base over which can be traversed longitudinally and laterally a saddle provided with a fixed index in such manner that the said index can be moved into register with any point on one of the photographs. A second index capable of independent lateral movement on the saddle but partaking of the same movements thereof is arranged to be moved into register with any point on the second photograph. In operating the machine the fixed index is kept in continuous register with an image-line or succession of adjacent image-points on one photograph while the second index is kept simultaneously in register with the corresponding image-line or succession of adjacent image-points on the second photograph.

The saddle carries a suitable cutting or graving tool beneath which on the base is fixed the material to be cut or fashioned to form the reproduction. The movement of the saddle derived from the movement of the fixed index causes the cutting tool to cut a groove in the material and the independent lateral movement of the second index, which by suitable mechanism is translated into up and down movement of the cutting tool, causes the groove to vary in depth. By the employment of known mechanism for varying the ratio between lateral movement of the second index and up and down movement of the cutting tool, provision is made for effecting reproductions on any desired scale of relief, the degree of relief obtainable from any pair of photographs being governed by the ratio of up and down movement of the cutting tool with respect to the lateral movement of the second index.

Repetition of the process with all pairs of image-lines on the photographs will complete the reproduction. Repetition of the process with one or more additional pairs of photographs taken from suitable base-lines enables the machine to produce relief on opposite sides of the object. By transposing the photographs on the base, i. e., placing them in opposite position to that required to produce a relief, the machine will produce intaglios, or if the photographs are printed reverse-wise or taken with a reversing prism a mould can be produced from which casts may be taken. In order to provide sufficient points or lines on the photographs to enable the machine to be more easily or readily operated, which may be requisite in sculpting the human figure for instance, such lines may be conveniently produced by projecting upon the object the image of a ruled screen through an optical lantern. The pattern on the ruled screen need not follow any regular geometrical design or constitute a regular pattern, and the position of the lantern employed for this purpose is not important nor is any of these factors essential as in known processes.

Figure 2:
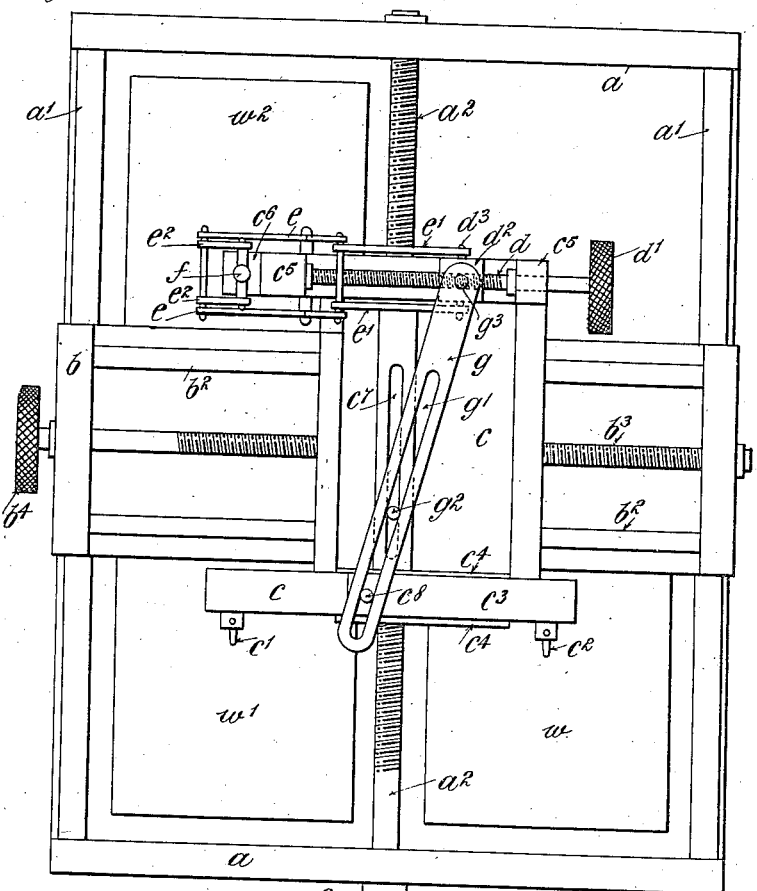
Fig. 2 is a view in plan of a machine embodying the present invention.
Figure 3:
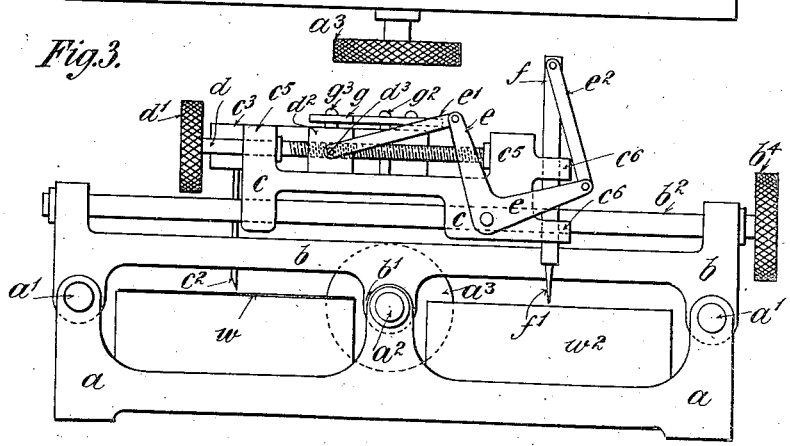
Fig. 3 is a view in end elevation thereof.

Figs. 2 and 3 show a convenient construction of machine for carrying out the present invention. This machine comprises a base $a$ provided with longitudinal and parallelly arranged guides $a^1$ on which is free to slide a carriage $b$. This carriage $b$ is traversed over the base $a$ longitudinally by a screw $a^2$ engaging a nut $b^1$ formed or carried on the carriage $b$. The screw $a^2$ is operable by a hand wheel $a^3$ or it may be operated automatically by power. On the base $a$ in appropriate positions are fixed the photographs $w$ and $w^1$ and the material $w^2$ to form the reproduction. The carriage $b$ is provided with lateral and parallelly arranged guides $b^2$ on which is free to slide a saddle $c$. This saddle $c$ is traversed on the carriage $b$ laterally by a screw $b^3$ engaging a nut on the saddle $c$ and operable by a projecting hand wheel $b^4$ or its equivalent. This saddle $c$ carries a fixed index or pointer $c^1$. A second index or pointer $c^2$ is carried by a block $c^3$ free to slide in lateral guides $c^4$ carried by the saddle $c$. Both indexes or pointers $c^1$, $c^2$ are so positioned that each can be moved into register with any point on the photograph to which it relates and they thus act as a gauge for measuring variations between the two photographs. The saddle $c$ also carries in bearings $c^5$ arranged laterally and parallelly with the sliding block $c^3$, a screw $d$, capable of being rotated by a hand wheel $d^1$ or its equivalent. A nut $d^2$ is mounted on the screw $d$ but is prevented from rotating thereon, so that by rotation of the screw $d$ the nut $d^2$ is traversed thereon. On the saddle $c$ is fulcrumed a pair—one on each side—of bell cranked levers $e$, the rear ends of which are pivoted to a pair of connecting links $e^1$. The free ends of said links $e^1$ are pivoted to trunnions $d^3$ carried by the nut $d^2$. The other or forward ends of the levers $e$ are pivoted to a second pair of connecting links $e^2$, the free ends of which are pivoted to the upper end of a shaft $f$ adapted to reciprocate vertically through bearings $c^6$ formed in the saddle $c$. The mechanism connecting the traversing nut $d^2$ to the reciprocating shaft $f$ is so proportioned that vertical movement of the shaft $f$ is proportional to lateral movement of the nut $d^2$.

The shaft $f$ carries any suitable form of rotatable or non-rotatable cutting tool $f^1$ and is so positioned as to be above the material $w^2$ fixed to the base $a$. The traversing nut $d^2$ is connected to the sliding block $c^3$ by a lever $g$ provided with a slot $g^1$. The fulcrum of the lever $g$ is in the form of a vertical pin $g^2$ arranged to be fixed in any position in a longitudinal slot $c^7$ formed in the saddle $c$. The lever $g$ is pivoted at $g^3$ to the traversing nut $d^2$ and the slot $g^1$ is engaged by a pin $c^8$ carried by the sliding block $c^3$.

The ratio between vertical movement of the cutting tool $f^1$ and lateral movement of the sliding block $c^3$ can thus be varied at will, for which purpose any suitable mechanism or gearing may be substituted for the slotted lever $g$. In operation the carriage $b$ being moved by its screw mechanism $a^2$, $b^1$ causes the tool $f^1$ to cut a groove in the material $w^2$ which groove, if the saddle $c$ be operated by screw $b^3$ to cause the fixed index finger or pointer $c^1$ to traverse an image-line on one photograph $w^1$, will correspond exactly with such line and if while the fixed index finger or pointer $c^1$ is traversing such line, the second index finger or pointer $c^2$ is by the mechanism $d$, $d^2$, $g$, $c^8$, of the saddle $c$ caused to traverse a corresponding image-line on the second photograph $w$ the tool $f^1$ will be caused to cut more or less deeply according to the varying distance between the two image-lines. Repetition of the process with all other pairs of corresponding image-lines will produce a surface consisting of a plurality of grooves which if the image-lines be sufficiently numerous will merge into one another to produce an unbroken surface.

Figure 4:
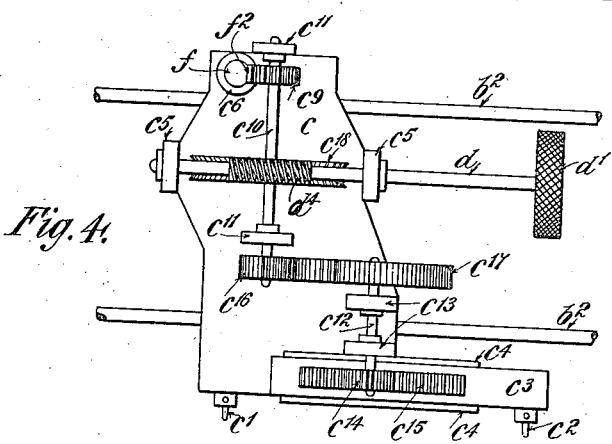
Fig. 4 is a broken view in plan of a modification.

In Fig. 4 is shown a modified constructional example of the invention. The disposition of the base, the photographs, the material to be cut, the carriage traversing the base and the actuating means corresponds to the former constructional example and is not shown. As in the former example a saddle $c$, is traversed laterally over the carriage by screw and nut mechanism. The saddle $c$ carries a fixed index $c^1$ and a second index $c^2$ is carried by a block $c^3$ free to slide in lateral guides $c^4$ carried by the saddle $c$. Both indexes $c^1$, $c^2$ are so positioned that each can be moved into register with any point on the photograph to which it relates and a shaft $f$ carrying the cutting tool is adapted to reciprocate vertically through bearings $c^6$ formed in the saddle $c$. A rack $f^2$ formed in or carried by the reciprocating shaft $f$ which carries the cutting tool meshes with a pinion $c^9$ carried by a longitudinal shaft $c^{10}$ journalled in bearings $c^{11}$ carried on the saddle $c$.

On a second longitudinal shaft $c^{12}$ journalled in bearings $c^{13}$ carried on the saddle $c$ is fixed a pinion $c^{14}$ meshing with a rack $c^{15}$ arranged laterally on the sliding block $c^3$ carrying the second index $c^2$. The two shafts $c^{10}$ and $c^{12}$ are coupled together by a pair of gear wheels $c^{16}$ and $c^{17}$ of suitable ratio or by belt and pulleys or other suitable gearing. In this construction the arrangement of screw $d$, nut $d^2$, trunnions $d^3$, connecting links $e^1$, $e^2$, bell cranked levers $e$, slotted lever $g$ and pins $g^2$ and $c^8$ detailed in the former example can be dispensed with, adjustments of the second index $c^2$ being made by means of a worm wheel $c^{18}$ carried on the shaft $c^{10}$ and operable by a worm $d^4$ carried on the shaft $d$. The shaft $d$ is journalled in bearings $c^5$ formed laterally in the saddle $c$, and is rotated by the hand wheel $d^1$. Provision can be made for readily substituting gear wheels of various ratios on the two shafts $c^{10}$, $c^{12}$ so that the ratio between vertical movement of the tool and lateral movement of the second index (and in consequence the degree of relief) can be altered as desired.

I declare that what I claim and desire to secure by Letters Patent is:—

1. A method of reproducing a copy of the surface of a three-dimensional figure, in the round, in relief or in intaglio from a pair of stereoscopic photographs of said figure characterized in that means utilizing the detail in one photograph are employed to control the movements of the cutting tool of a carving machine in two dimensions (e. g. height and breadth) and means for utilizing the variations between the two photographs to control the movements of the tool in the third dimension (e. g. depth), as set forth.

2. Apparatus for carrying out the method of reproducing a copy of the surface of a three-dimensional figure in the round, in relief or in intaglio from a pair of stereoscopic photographs in which the detail in one photograph is utilized to control the movements of the cutting tool of a carving machine in two dimensions (e. g. height and breadth) while variations between the two photographs are utilized to control the movements of the tool in the third dimension (e. g. depth), comprising a carrier for the photographs and the material to be cut, a gauge for measuring variations between the photographs, and a cutting tool coupled for movements in two dimensions to one end of the gauge and coupled for movements in the third dimension to the other end of the gauge, as set forth.

3. Apparatus for carrying out the method of reproducing a copy of the surface of a three-dimensional figure in the round, in relief or in intaglio from a pair of stereoscopic photographs in which the detail in one photograph is utilized to control the movements of the cutting tool of a carving machine in two dimensions (e. g. height and breadth) while variations between the two photographs are utilized to control the movements of the tool in the third dimension (e. g. depth) comprising a carrier for the photographs and the material to be cut, a gauge for measuring variations between the photographs, a cutting tool coupled for movements in two dimensions to one end of the gauge and coupled for movements in the third dimension to the other end of the gauge and a lever with variable arm-lengths to form part of the coupling between the tool and the gauge so that the ratio that movements of the tool in the third dimension bear to adjustments of the gauge can be varied at will, as set forth.

4. An apparatus for mechanically reproducing portraits, figures or the like in the round, in relief or in intaglio from a pair of stereoscopic photographs comprising a base, means for carrying the photographs and the material to be cut on said base, a carriage capable of being traversed longitudinally over said base, a saddle free to be guided and slid laterally over said carriage, a block free to slide in lateral guides carried by the saddle, two indexes carried by said saddle, one of said indexes being fixed to said saddle and the other being carried by said sliding block and both said indexes being so positioned with respect to the pair of photographs that each can be moved into any position over the same, a vertically arranged cutting tool carried by said saddle and so positioned with respect to the material to be cut that movement of the fixed index derived from longitudinal movement of the carriage or from lateral movement of the saddle or from a combination of these movements causes the tool to cut a groove in the material and mechanism for translating the movement of the movable index into an up and down movement of the cutting tool, as set forth.

5. An apparatus for mechanically reproducing portraits, figures or the like in the round, in relief or in intaglio from a pair of stereoscopic photographs comprising a base, means for carrying the photographs and the material to be cut on said base, a carriage capable of being traversed longitudinally over said base, a saddle free to be guided and slid laterally over said carriage, a block free to slide in lateral guides carried by the saddle, two indexes carried by said saddle, one of said indexes being fixed to said saddle and the other being carried by said sliding block and both said indexes being so positioned with respect to the pair of photographs that each can be moved into any position over the same, a vertically arranged cutting tool carried by said saddle and so positioned with respect to the material to be cut that movement of the fixed index derived from longitudinal movement of the carriage or from lateral movement of the saddle or from a combination of these movements causes the tool to cut a groove in the material, mechanism for translating the movement of the movable index into an up and down movement of the cutting tool, and means for varying the ratio between the lateral movement of the movable index and the vertical movement of the tool, as set forth.

6. An apparatus for mechanically reproducing portraits, figures or the like in the round, in relief or in intaglio from a pair of stereoscopic photographs comprising a base, means for carrying the photographs and the material to be cut on said base, a carriage capable of being traversed longitudinally over said base, a saddle free to be guided and slid laterally over said carriage, a block free to slide in lateral guides carried by the saddle, two indexes carried by said saddle, one of said indexes being fixed to said saddle and the other being carried by said sliding block and both said indexes being so positioned with respect to the pair of photographs that each one can be moved into any position over the same, a screw working through bearings carried on said saddle, arranged parallel to the said sliding block and capable of being rotated by a hand wheel, a nut mounted on said screw but prevented from rotating thereon, a vertically arranged reciprocating shaft carrying a cutting tool at its lower end and adapted to reciprocate in bearings in the saddle over the material to be cut, a pair of bell cranked levers fulcrumed to said saddle, the rear ends of each lever being pivoted by a pair of connecting links to trunnions carried by said nut and the forward ends being pivoted by a pair of connecting links to the upper end of the reciprocating shaft and means for connecting the traversing nut and the sliding block together so that the ratio of movement between them can be varied at will, such as a slotted lever, the fulcrum of which is intermediate between its ends and is carried adjustably on the saddle, as set forth.

ELIZABETH EDITH TOWNSEND.